United States Patent [19]

McShea, III et al.

[11] Patent Number: 4,927,857

[45] Date of Patent: * May 22, 1990

[54] METHOD OF METHANOL PRODUCTION

[75] Inventors: William T. McShea, III, Martinsville; Robert M. Yarrington, Westfield, both of N.J.

[73] Assignee: Engelhard Corporation, Edison, N.J.

[*] Notice: The portion of the term of this patent subsequent to Jul. 4, 2006 has been disclaimed.

[21] Appl. No.: 298,875

[22] Filed: Jan. 18, 1989

Related U.S. Application Data

[63] Continuation of Ser. No. 430,452, Sep. 30, 1982, abandoned.

[51] Int. Cl.$^5$ .......................... C07C 27/06; C01B 3/36
[52] U.S. Cl. ...................................... 518/703; 252/373
[58] Field of Search .......................... 518/703; 252/373

[56] References Cited

U.S. PATENT DOCUMENTS

| | | | |
|---|---|---|---|
| 2,683,152 | 7/1954 | Dickinson | 518/703 |
| 2,964,551 | 12/1960 | Woolcock | 518/703 |
| 3,048,476 | 8/1962 | Dwyer | 252/373 |
| 3,278,452 | 10/1966 | Vorum | 252/376 |
| 3,481,722 | 12/1969 | Pfefferle | 48/214 |
| 3,763,205 | 10/1973 | Green | 252/373 |
| 4,054,407 | 10/1977 | Carrubba et al. | 431/10 |
| 4,168,945 | 9/1979 | Kirby | 252/477 R |
| 4,233,187 | 11/1980 | Atwood et al. | 252/373 |

FOREIGN PATENT DOCUMENTS

| | | | |
|---|---|---|---|
| 275462 | 3/1964 | Australia | 252/373 |
| 1417796 | 10/1968 | Fed. Rep. of Germany | . |
| 5662542 | 5/1981 | Japan | 252/477 R |
| 836909 | 6/1960 | United Kingdom | 518/703 |

OTHER PUBLICATIONS

Schmolder, *Brennstoffe-Chemie*, vol. 46, No. 4, pp. 23-26 (English translation).

*Primary Examiner*—Bruce D. Gray

[57] ABSTRACT

A process for methanol production includes preparing a hydrogen containing synthesis gas by autothermally reforming a hydrocarbonaceous feed, such as a hydrocarbon feed, with oxygen and steam in an autothermal reformer utilizing a first, monolithic catalyst having a palladium and platinum containing catalyst therein, and a second, platinum group metal steam reforming catalyst. The autothermal reformer provides a relatively simple and compact reactor within which a wide variety of hydrocarbonaceous feeds, from heavy hydrocarbon feedstocks to natural gas, may be utilized for producing methanol synthesis gas, which is advantageously carried out at an elevated pressure. By controlling $H_2O$ to carbon and $O_2$ to carbon feed ratios, a given feed can be autothermally reformed to yield a synthesis gas of desired ratio of 1 $H_2$ to $(2CO+3CO_2)$ for methanol production.

25 Claims, 1 Drawing Sheet

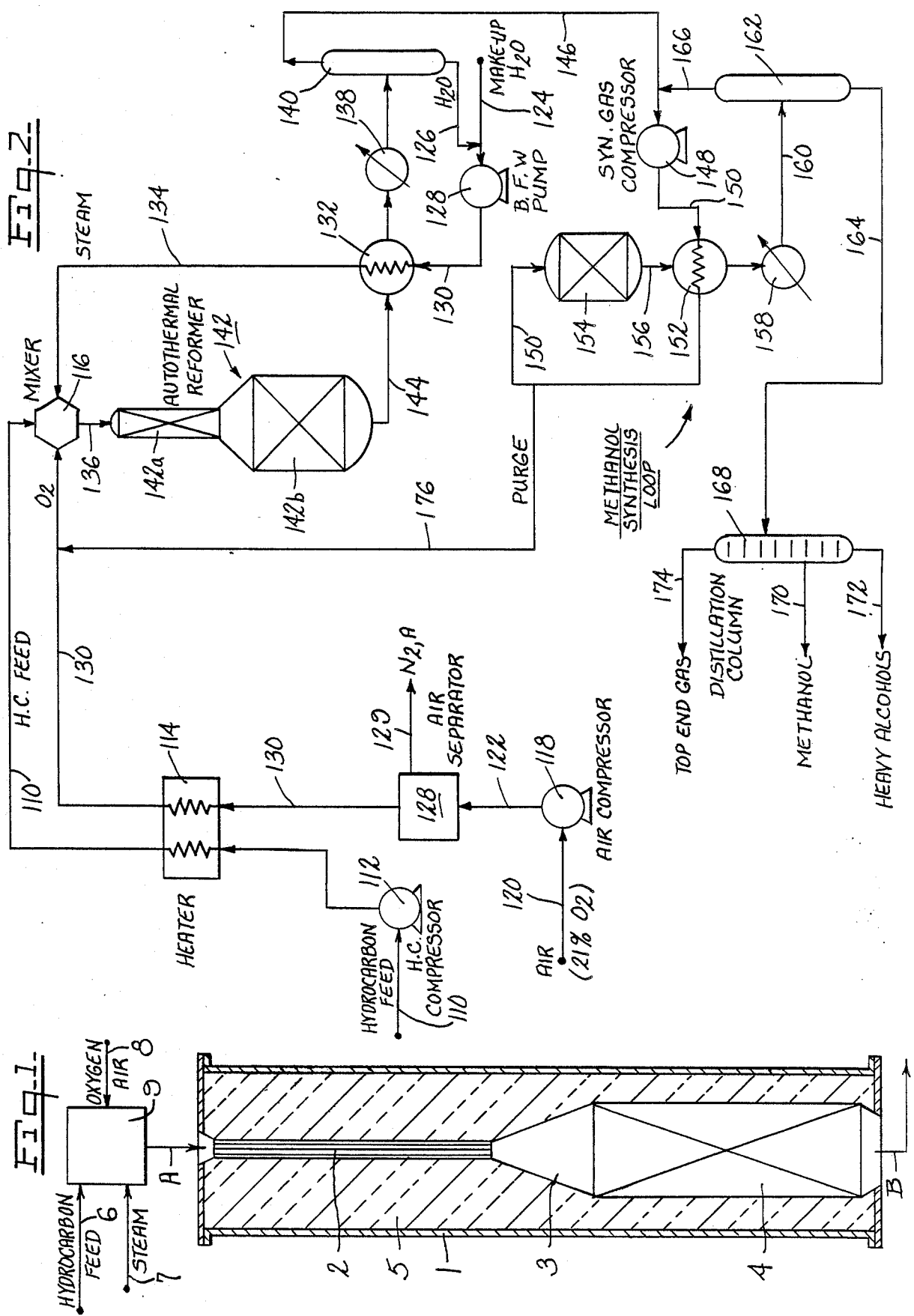

METHOD OF METHANOL PRODUCTION

This is a continuation of co-pending application Ser. No. 06/430,452 filed on Sept. 30, 1982.

BACKGROUND OF THE INVENTION

The present invention is concerned with the production of methanol from a hydrocarbonaceous feed, including the production of a synthesis gas containing hydrogen, more particularly, with the preparation of a synthesis gas comprising hydrogen and carbon oxides in selected molar ratios required for the synthesis of methanol. As used herein and in the claims, the term "hydrocarbonaceous feed" is intended to include, without limitation, hydrocarbon feeds of all types, as well as alcohols such as ethanol, methanol and mixtures thereof, and biomass-derived feeds which normally contain compounds of carbon, hydrogen and oxygen, and sometimes compounds of nitrogen and sulfur, as well as one or more of the foregoing elements in elemental form. Such biomass-derived feeds may be obtained by any suitable process such as fermentation of grains or other materials including food products generally, from treatment of agricultural by-products and waste products, or by distillation or combustion (with insufficient oxygen for stoichiometric reaction) of wood and/or other cellulosic products and by-products.

Reference hereinbelow and in the claims to a "synthesis gas" or "synthesis gases" will be understood to mean a gas mixture comprising hydrogen and one more of carbon oxides, possibly with other constituents, such as $H_2O$, Sulfur compounds, inert gases and the like. Such other constituents are often removed prior to or during the synthesis operation in which the synthesis gas is used.

A synthesis gas for the production of methanol may be prepared by the partial oxidation of hydrocarbonaceous feeds, such as the heavier hydrocarbons, e.g., fuel oil and coal, and by steam reforming of hydrocarbonaceous feeds, such as the lighter hydrocarbons, e.g., natural gas and naphthas. Processes to derive synthesis gases form methanol or coal derived hydrocarbons are also known.

Generally, difficulties associated with the preparation of synthesis gases from heavier feedstocks favor the use of light naphthas or natural gas when a hydrocarbon is the source of the hydrocarbonaceous feed. However, shortages of such light hydrocarbon feeds indicate the need for an economical process for generating a synthesis gas from heavier hydrocarbon feedstocks, such as normally liquid hydrocarbons.

On the other hand, natural gas (methane) may comprise the feedstock. For example, in some areas of the world, natural gas is abundant but transportation fuels such as gasoline are not. In other areas of the world, there is a demand for natural gas but the transportation costs to ship the natural gas from areas where it is available to where it is needed are often so great as to render such shipments uneconomical. One approach to utilizing such natural gas supplies is to convert the natural gas to methanol in which form it may be shipped more economically. The methanol may be used as a fuel for internal combustion engines, either by itself or blended with gasoline, or it may be used in other synthesis schemes, including conversion to a gasoline.

Steam reforming is a well known method for generating synthesis gas from light hydrocarbon feeds and is carried out by supplying heat to a mixture of steam and a hydrocarbon feed while contacting the mixture with a suitable catalyst, usually nickel. However, steam reforming is generally limited to paraffinic naphtha and lighter feeds which have been de-sulfurized and treated to remove nitrogen compounds, because of difficulties in attempting to steam reform heavier hydrocarbons and the poisoning of steam reforming catalysts by sulfur and nitrogen compounds. Steam reforming is carried out in a tubular furnace containing catalysts disposed within the tubes and means to supply heat to the tubes in order to sustain the endothermic steam reforming reaction. Such processes are well known to the art, as indicated by the article "Checklist for High Pressure Reforming" by Orlando J. Quartulli appearing at pages 151-162 of *Hydrocarbon Processing*, April, 1965, Vol. 44, No. 4.

Another known method of obtaining hydrogen from a hydrocarbon feed is the partial oxidation process in which the feed is introduced into an oxidation zone maintained in a fuel rich mode so that only a portion of the feed is oxidized. Steam may be injected into the partial oxidation reactor vessel to react with the feed and with products of the partial oxidation reaction. The process is not catalytic and requires high temperatures to carry the reactions to completion, resulting in a relatively high oxygen consumption. On the other hand, the partial oxidation process has the advantage that it is able to readily handle hydrocarbon liquids heavier than paraffinic naphthas and can even utilize coal as the source of the hydrocarbon feed.

Catalytic autothermal reforming of hydrocarbon liquids is also known in the art, as evidenced by a paper *Catalytic Autothermal Reforming of Hydrocarbon Liquids* by Maria Flytzani-Stephanopoulos and Gerald E. Voecks, presented at the American Institute of Chemical Engineer's 90th National Meeting, Houston, Texas, Apr. 5-9, 1981. Autothermal reforming is defined therein as the utilization of catalytic partial oxidation in the presence of added steam, which is said to increase the hydrogen yield because of simultaneous (with catalytic partial oxidation) steam reforming being attained. Steam, air and a No. 2 fuel oil are injected through three different nickel particulate catalysts and the resulting product gases contained nitrogen, hydrogen and carbon oxides.

In *Brennstoff-Chemie* 46, No. 4, p. 23 (1965), a German publication, Von P. Schmulder describes a Badische Anilin and Soda Fabrik (BASF) process for autothermal reforming of gasoline utilizing a first, pelletized, platinum catalyst zone followed by a second, pelletized nickel catalyst zone. A portion of the product gas is recycled to the process.

Disclosure of the utilization of a noble metal catalyzed monolith to carry out a catalytic partial oxidation to convert more than half of the hydrocarbon feedstock upstream of a stream reforming zone is disclosed in an abstract entitled "Evaluation of Steam Reforming Catalysts for use in Autothermal Reforming of Hydrocarbon Feed Stocks" by R. M. Yarrington, I. R. Feins, and H. S. Hwang, National Fuel Cell Seminar, July 14-16, 1980, San Diego. The abstract noted the unique ability of rhodium to steam reform light olefins with little coke formation and noted that results were obtained for a series of platinum-rhodium catalysts with various ratios of platinum to total metal in which is total metal content was held constant.

U.S. Pat. No. 4,054,407, assigned to the assignee of this application, discloses two-stage catalytic oxidation using platinum group metal catalytic components dispersed on a monolithic body. At least the stoichiometric amount of air is supplied over the two stages and steam is not employed.

U.S. Pat. No. 3,481,722, assigned to the assignee of this application, discloses a two-stage process for steam reforming normally liquid hydrocarbons using a platinum group metal catalyst in the first stage. Steam and hydrogen, the latter of which may be obtained by partially cracking the hydrocarbon feed, are combined with the feed to the process.

The present invention provides a highly efficient method for producing synthesis gases required for the production of methanol from hydrocarbonaceous feeds, including hydrocarbons, which attains excellent yields in a relatively compact and simple apparatus.

SUMMARY OF THE INVENTION

In accordance with the present invention there is provided a process for the production of methanol from a hydrocarbonaceous feed, the process comprising the following steps. Preheating an inlet steam comprising a hydrocarbonaceous feed, $H_2O$, and oxygen to a preheat temperature sufficiently high to initiate catalytic oxidation of the feed as defined below. Introducing the preheated inlet stream into a first catalyst zone comprising a monolithic body having a plurality of gas flow passages extending therethrough and having a catalytically effective amount of palladium and platinum catalytic components dispersed therein, the amounts of feed, $H_2O$ and oxygen introduced into said first catalyst zone being controlled to maintain in said inlet stream an $H_2O$ to C ratio of from about 0.5 to 3, preferably from about 1 to 2.5, and $O_2$ to C ratio of from about 0.35 to 0.65, preferably, from about 0.5 to 0.6. contacting the preheated inlet stream within the first catalyst zone with the palladium and platinum catalytic components to initiate and sustain therein catalytic oxidation of the feed to produce hydrogen and carbon oxides therefrom, the temperature of at least a portion of said monolithic body being at least about 250° F. (139° C.) greater than the ignition temperature of said inlet stream and oxidizing in the first catalyst zone a quantity, less than all, of the feed, which quantity is sufficient to heat such first zone effluent to an elevated temperature high enough to catalytically steam reform, within a second catalyst zone defined below, hydrocarbon remaining in such fist zone effluent without supplying external heat thereto. Passing the first zone effluent, while still at an elevated temperature, from the first catalyst zone to a second catalyst zone containing a platinum group metal steam reforming catalyst therein, and contacting the first zone effluent in the second catalyst zone with the reforming catalyst to react hydrocarbons therein with $H_2O$ to produce hydrogen and carbon oxides therefrom, and withdrawing the effluent of the second catalyst zone as the hydrogen-rich synthesis gas and cooling the withdrawn gas. In some cases the process may include the additional step of removing impurities such as sulfur containing compounds and $H_2O$ from the synthesis gas and passing the gas from the sulfur compound—removing step to a methanol synthesis loop to react the hydrogen with carbon oxides thereof over a methanol synthesis catalyst at methanol synthesis conditions. Withdrawing methanol as product from the methanol synthesis loop.

Preferred aspects of the invention provide one or more of the following individual features. The hydrocarbonaceous feed may be a hydrocarbon feed. The preheat temperature may be from about 800° F. to 1400° F. (427° C. to 760° C.) and the first catalyst zone may be maintained at a temperature of from about 1750° F. to 2400° F. (954° C. to 1316° C.), with the first zone effluent being introduced into the second catalyst zone at substantially the same temperature. A volumetric hourly rate of at least 100,000 volumes of throughput per volume of catalyst may be maintained in the first catalyst zone and a volumetric hourly rate of from about 2,000 to 20,000 volumes of throughput per volume of catalyst may be maintained in the second catalyst zone. The first catalyst zone comprises palladium, platinum, and optionally, rhodium catalytic components distended upon a refractory metal oxide support layer carried on the monolithic body. The steam reforming catalyst may comprise one or both of platinum and rhodium catalytic components, preferably also distended upon refractory metal oxide support.

In other preferred aspects of the invention, the process may be carried out at a pressure of from about 100 to 1500 psia, more preferably 100 to 1100 psia. The feed may be a normally liquid hydrocarbon or a normally gaseous hydrocarbon.

In another aspect of the invention, the feed is a hydrocarbon and there is included the additional step of treating the synthesis gas withdrawn form the second catalyst zone to remove impurities such as $H_2S$ and COS and to remove $H_2O$ from the.synthesis gas. Generally, conditions, such as the $H_2O$ to C and $O_2$ to C ratios in the inlet stream, are maintained so as to provide a methanol synthesis gas with a molar ratio of $H_2$ to (2CO +3CO$_2$) from of unity or greater, say from about 1.0 to 2.0 mostly preferably from about 1.3 to about 1.5. It may be desirable to remove $CO_2$ from the synthesis gas, by well known methods.

Other aspects of the invention provide that the amounts of feed, $H_2O$ and oxygen introduced into the first catalyst zone are controlled to maintain in the inlet steam and $H_2O$ to C ratio of from about 1 to 3, and an $O_2$ to C ratio of from about 0.5 to 0.6.

BRIEF DESCRIPTION OF THE DRAWINGS

FIG. 1 is a schematic elevation view in cross section of laboratory or pilot plant size embodiment of an autothermal reformer apparatus utilizable in accordance with the present invention; and FIG. 2 is a schematic flow sheet diagram of a methanol synthesis plant including a snythesis gas making section, in accordance with one embodiment of the present invention, the synthesis gas section including an autothermal reformer.

DESCRIPTION OF THE PREFERRED EMBODIMENTS

In a preferred embodiment of the present invention, a synthesis gas making plant includes an autothermal reformer for generation of hydrogen from a hydrocarbonaceous feed. The autothermal reformer includes a first catalyst zone for carrying out catalytic partial oxidation, an exothermic reaction, and a second catalyst zone for carrying out steam reforming, an endothermic reaction. Some steam reforming also appears to take place in the first catalyst zone and thereby moderates somewhat the temperatures attained in the first catalyst zone inasmuch as the endothermic steam reforming absorbs some of the heat generated by the partial oxidation step. The net reaction in the first catalyst zone is however exothermic and the zone therefore referred to as an exothermic catalyst zone. The exothermic, first catalyst zone comprises a monolithic catalyst carrier on which a platinum group metal catalyst is dispersed. Such catalyst can effectively catalyze the partial oxidation of not only gaseous and light hydrocarbon liquids such as natural gas or paraffinic naphtha, but of heavier hydrocarbons such as diesel oil, number 2 fuel oil, and coal derived liquids. As compared to a non-catalytic partial oxidation, catalytic partial oxidation enables the utilization of lesser amounts of oxygen and lower temperature levels to both oxidize a portion of the feed and crack heavier hydrocarbon feedstocks to lighter hydrocarbon fractions, while raising the temperature of the reactant mass for subsequent treatment. The ability to use less oxygen has advantages in increasing the overall yield of the process.

Generally, at least about half the hydrocarbon feedstock is partially oxidized in the catalytic partial oxidation zone to produce primarily carbon oxides and hydrogen and the heat required for the endothermic steam reforming reaction, which takes place in the second catalyst zone. Substantially all of the limited amount of oxygen introduced into the first catalyst zone may be consumed in the catalytic partial oxidation step. At the temperatures maintained in the catalytic oxidation zone, and in the presence of the product hydrogen and catalyst utilized in the first zone, a degree of hydrocracking of unoxidized $C_5$ and heavier hydrocarbon feed, if any is present, takes place to form $C_4$ and lighter compounds. The effluent gas from the first catalyst zone thus contains primarily CO, $H_2$ and $H_2O$ and, when a hydrocarbon feed is used, $C_2$ to $C_4$ and other lighter hydrocarbons, including olefines, and, depending upon the sulfur content of the feedstock, $H_2S$ and COS.

The endothermic, second catalyst zone may contain any suitable platinum group metal steam reforming catalyst. Usually, the steam reforming catalyst will be utilized in the form of a particulate bed comprised of spheres, extrudates, granules, configured packing material, e.g., rings, saddles or the like, or any suitable shape. Obviously, a combination of different types of particulate materials may be utilized as the steam reforming catalyst. Further, a monolithic catalyst carrier may be used in the second catalyst zone, as is used in the first catalyst zone. The catalyst metal for the steam reforming zone may comprise any platinum group metals such as, e.g., platinum or rhodium or combinations thereof.

The combination of features provided by the process of the present invention provides a highly efficient process of manufacturing a snythesis gas by converting various types of hydrocarbonaceous feeds, including hydrocarbon feeds, to a hydrogen-rich synthesis gas. The combination of the monolithic platinum group metal partial oxidation catalyst with a platinum group metal steam reforming catalyst provides a great flexibility in handling diverse feedstocks, including heavy hydrocarbon feedstocks not normally well-suited for generating a synthesis gas. For example, a wide range of $O_2$ to carbon (atoms of carbon in the feed) and $H_2O$ to carbon ratios may be used. The Monolithic Partial Oxidation Catalyst The partial oxidation catalyst is provided on a monolithic carrier, that is, a carrier of the type comprising one or more monolithic bodies having a plurality of finely divided gas flow passages extending therethrough. Such monolithic carrier members are often referred to as "honeycomb" type carriers and are well know in the art. A preferred form of such carrier is made of a refractory, substantially inert rigid material which is capable of maintaining its shape and a sufficient degree of mechanical strength at high temperatures, for example, up to about 3272° F. (1800° C.). Typically, a material is selected for the support which exhibits a low thermal coefficient of expansion, thermal shock resistance, and though not always, low thermal conductivity. Two general types of material of construction for such carriers are known. One is a ceramic-like porous material comprised of one or more metal oxides, for example; alumina, alumina-silica, alumina-silica-titania, mullite, cordierite, zirconia, zirconia-spinel, zirconia-mullite, silicon carbide, etc. A particularly preferred and commercially available material of construction for operations below about 2000° F. (1093° C.) is cordierite, which is an alumina-magnesia-silica material. For applications involving operations above about 2000° F. (1093° C.), an alumina-silica-titania material is preferred. Honeycomb monolithic supports are commercially available in various sizes and configurations. Typically, the monolithic carrier would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to 1,200, preferably 200–600 gas flow channel per square inch of face area.

The second major type of preferred material of construction for the carrier is a heat- and oxidation-resistant metal, such as a stainless steel or the like. Monolithic supports are typically made from such materials by placing a flat and a corrugated metal sheet one over the other and rolling the stacked sheets into a tubular configuration about an axis parallel to the corrugations, to provide a cylindrical-shaped body having a plurality of fine, parallel gas flow passages extending therethrough. The sheets and corrugations are sized to provide the desired number of gas flow passages, which may range, typically, from about 200 to 1,200 per square inch of end face of the tubular roll.

Although the ceramic-like metal oxide materials such as cordierite or alumina-silica-titania are somewhat porous and rough-textured, they nonetheless have a relatively low surface area with respect to catalyst support requirements and, of course, a stainless steel or the other metal support is essentially smooth. Accordingly, a suitable high surface area refractory metal oxide support layer is deposited on the carrier to serve as a support upon which finely dispersed catalytic metal may be distended. As is known in the art, generally, oxides of one or more of the metals of Groups II, III and IV of the Periodic Table of Elements having atomic numbers not greater than 40 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina. As used herein and in the claims, "transition alumina" includes gamma, chi, eta, kappa, theta and delta forms and mixtures thereof. An alumina comprising or predominating in gamma alumina is the most preferred support layer, it is known that certain additives such as, e.g., one or more rare earth metal oxides and/or alkaline earth meal oxides may be included int he transition alumina (usually in amounts comprising from 2 to 10 weight percent of the stabilized coating) to stabilize it against the generally undesirable high temperature phase transition to alpha alumina, which has a relatively low surface area. For example, oxides of one or more of lanthanum, cerium, praseodynium, calcium, barium, strontium and magnesium may be used as a stabilizer. The specific combination of oxides of lanthanum and barium is a preferred stabilizer for transition alumina.

The most preferred platinum group metals for the monolithic partial oxidation catalyst are platinum, palladium and rhodium and combinations of two or more thereof. The platinum group metal may optionally be supplemented with one or more base metals, particularly base meals of Group VII and metals of Groups VB, VIB, and VIIB of the Periodic Table of Elements. Preferably, one or more of chromium, copper vanadium, cobalt, nickel and iron may be employed.

Desirable catalysts for partial oxidation should have the following properties: They should by able to operate effectively under conditions varying from oxidizing at the inlet to reducing at the exit; they should operate effectively and without significant temperature degradation over a temperature range of about 800° F. to about 2400° F. (427° C. to 1315° C.); they should operate effectively in the presence of carbon monoxide, olefins and sulfur compounds, they should provide for low levels of coking such as by preferentially catalyzing the reaction of carbon with $H_2O$ to form carbon monoxide and hydrogen thereby permitting only a low level of carbon on the catalyst surface; they must be able to resist poisoning from such common poison as sulfur and halogen compounds; further, all of these requirements must be satisfied simultaneously. For example, in some otherwise suitable catalysts, carbon monoxide may be retained by the catalyst meal at low temperatures thereby decreasing or modifying its activity. The combination of platinum and palladium is a highly efficient oxidation catalyst for the purposes of the present invention. Generally, the catalytic activity of platinum-palladium combination catalysts is not simply an arithmetic combination of their respective catalytic activities; the disclosed range of proportions of platinum and palladium have been found to posses the previously described desirable qualities and in particular provide efficient and effective catalytic activity in treating a rather wide range of hydrocarbonaceous, particularly hydrocarbon, feeds with good resistance to high temperature operation and catalyst poisons.

The following data compares the effectiveness of palladium, rhodium and platinum, respectively, for the oxidation of methane and further compares the efficacy of, respectively, palladium-platinum, palladium-rhodium and platinum-rhodium combined catalysts for oxidation of methane.

The catalysts of Table 1-A comprise a lanthia-chromia-alumina frit impregnated with platinum group metals by techniques which are well known. The frit has the following composition:

| Component | Weight Percent |
| --- | --- |
| $La_2O_3$ | 3.8 |
| $Cr_2O_3$ | 1.8 |
| $Al_2O_3$ | 94.4 |

The lanthia-chromia stabilized alumina is then impregnated with the platinum group metal and calcined in air for four hours at 230° F. and for an additional four hours at 1600° F. Three catalysts of different platinum metal loading were prepared as follows:

| Sample No. | Weight Percent | | | |
| --- | --- | --- | --- | --- |
| | Pd | Pt | Rh | Total PGM |
| 4063U-1 | 3.42 | 5.95 | — | 9.37 |
| 4063R-1 | 4.58 | — | 4.52 | 9.10 |
| 4063V-1 | — | 5.62 | 3.14 | 8.76 | the resultant platinum group metal (PGM) impregnated alumina frit was deposited on alumina beads and thus-coated beads were placed in a shallow bed and tested by passing 1% (volume) methane 99% (volume) air feed at about atmospheric pressure through the catalyst. An electric heater was used to cyclically heat the test gas stream fed to the catalyst, and conversion results at the indicated temperatures were obtained on both the heating and cooling phases of each cycle.

The results are shown in the following Table I-A.

TABLE I-A

| Sample No. | PGM (Mole Ratio) | Ignition Temp. °F. | Weight Percent of Original Methane Content Converted at Indicated Temperature (°F.) | | | | | |
| --- | --- | --- | --- | --- | --- | --- | --- | --- |
| | | | 600° | 700° | 800° | 900° | 1000° | 1100° |
| 4063U-1 | Pd,Pt(1:1) | 610 | — | 3 | 10 | 26 | 60 | 80 |
| 4063R-1 | Pd,Rh(1:1) | 710 | — | — | 2 | 5 | 9 | 12 |
| 4063V-1 | Pt,Rh(1:1) | 730 | — | — | 1 | 1 | 3 | 5 |

Although palladium alone would be a better methane oxidation catalyst than the palladium containing bimetallic catalysts of Table I-A, the palladium-platinum combination, in addition to being able to effectively handle a wide range of feeds, which palladium alone could not, is still an effective methane oxidation catalyst.

Rhodium may optionally be included with the platinum and palladium. Under certain conditions, rhodium is an effective oxidation as well as a steam reforming catalyst, particularly for light olefins. The combined platinum group metal catalysts of the invention also have a significant advantage in the ability to catalyze the autothermal reactions at quite low ratios of $H_2O$ to carbon (atoms of carbon in the feed) and oxygen to carbon, without significant carbon deposition on the catalyst. This important feature provides flexibility in selecting $H_2O$ to C and $O_2$ to C ratios in the inlet streams to be processed.

The platinum group metals employed in the catalysts of the present invention may be present in the catalyst composition in any suitable form, such as the elemental metals, as alloys or intermetallic compounds with the other platinum group metal or metals present, or as compounds such as an oxide of the platinum group metal. As used in the claims, the terms palladium, platinum and/or rhodium "catalytic component" or "catalytic components" is intended to embrace the specified platinum group metal or metals present in any suitable form. Generally, reference in the claims or herein to platinum group metal or metals catalytic component or components embraces one or more platinum group metals in any suitable catalytic form. Table I-A demonstrates that the palladium-rhodium and platinum-rhodium combinations are rather ineffective for methane oxidation. The effectiveness of rhodium as a methane oxidation catalyst is attenuated by the relatively high calcination temperature of 1600° F. At a lower calcination temperature used in preparation of the catalyst, say 1100° F., rhodium retains good methane oxidation characteristics. However, the catalytic partial oxidation catalyst of the present invention may operate at ranges well above 1100° F., which would probably also reduce the effectiveness of rhodium for methane oxidation.

The tests in which the results of Table I-A were developed used a bed of the platinum group metal-impregnated frit dispersed on alumina beads, rather than a monolithic body on which the frit is dispersed. The bed of frit-coated beads was of shallow depth to avoid excessive pressure drop. The geometric configuration of a 400 cell/in² monolithic body provides more geometric surface area exposed to the reactant gas than does a bed of coated beads. The catalytic partial oxidation reactions of this invention are extremely rapid at the temperatures involved. Therefore, the catalytic metals on the surface of the catalyst body are predominantly involved in the reactions. The results of the tests with coated beads are indicative of results with monolithic bodies, but lower catalytic metal loading can be used with the latter as compared to metal loadings on beads, to attain equivalent results.

Table I-B shows the results of testing a monolithic body-supported catalyst on which a ceria-stabilized alumina frit impregnated with the indicated platinum group metals was dispersed upon a monolithic support. The alumina frit comprised 5% by weight $CeO_2$, balance $Al_2O_3$, impregnated with one or two platinum group metals to provide the loadings indicated in Table I-B. The catalyst was calcined in air at 500° C. for two hours and then was aged 24 hours at 1800° F. in air.

Two different test gases, A and B, having the following compositions were passed through the catalyst:

| COMPOSITION | PARTS PER MILLION (VOL) OR VOLUME PERCENT | |
|---|---|---|
| | A | B |
| $O_2$ | 3% | 3% |
| CO | 1% | 1% |
| $CO_2$ | 10% | 10% |
| $H_2O$ | 10% | 10% |
| NO | 500 ppm | 500 ppm |
| $C_2H_4$ | 300 ppm | — |
| $C_3H_8$ | — | 300 ppm |
| $N_2$ | balance | balance |

Table I-B indicates the temperature in degrees centigrade necessary for conversion of 50% by weight of the original amount of the component present, indicated under the column heading $T_{50}$, and the temperature required for 75% by weight conversion, under the heading $T_{75}$. A lower temperature accordingly indicates a more active catalyst. The results obtained are as follows; the platinum group metal (PGM) loading on the monolithic support is shown as grams of platinum group metal per cubic of monolithic catalyst.

TABLE I-B

| Catalyst Sample No. | PGM Weight Ratio Pt:Pd | PGM Loading Pt/Pd (g/in³) | Total PGM Loading (g/in³) |
|---|---|---|---|
| 892-68-SSP | 100:00 | .051/— | .051 |
| 892-69-SSP | 82:18 | .044/.010 | .054 |
| 892-70-SSP | 58:42 | .027/.019 | .046 |
| 892-71-SSP | 25:75 | .011/.031 | .042 |
| 892-72-SSP | 0:100 | —/.039 | .039 |
| 892-76-SSP | 11:89 | .003/.025 | .028 |
| P-PX | 100:00 | .035/— | .035 |
| P-PXIIB | 70:30 | .034/.014 | .048 |

| Component | | Test Gas A | | | | Test Gas B | | | |
|---|---|---|---|---|---|---|---|---|---|
| | | CO | | $C_2H_4$ | | CO | | $C_3H_8$ | |
| Percent PGM | Conversion Sample No. | $T_{50}$ °C. | $T_{75}$ °C. | $T_{50}$ °C. | $T_{75}$ °C. | $T_{50}$ °C. | $T_{75}$ °C. | $T_{50}$ °C. | $T_{75}$ °C. |
| (Pt) | 892-68-SSP | 325 | 335 | 325 | 335 | 265 | 275 | 470 | 565 |
| (Pd/Pt) | 892-69-SSP | 270 | 275 | 280 | 290 | 280 | 285 | 545 | 615 |
| (Pd/Pt) | 892-70-SSP | 235 | 250 | 260 | 305 | 260 | 265 | 495 | 640 |
| (Pd/Pt) | 892-71-SSP | 235 | 245 | 260 | 320 | 260 | 270 | 465 | 585 |
| (Pd) | 892-72-SSP | 230 | 235 | 245 | 270 | 245 | 255 | 440 | 510 |
| (Pd/Pt) | 892-76-SSP | 270 | 275 | 275 | 315 | 245 | 255 | 430 | 555 |
| (Pt) | P-PX | 345 | 355 | 350 | 365 | 320 | 330 | 495 | 550 |
| (Pd/Pt) | P-PXIIB | 255 | 265 | 265 | 290 | 245 | 250 | 485 | 585 |

The data of Table I-B demonstrates the lower temperatures at which a palladium containing catalyst will attain, respectively, 50% and 75% conversion of ethylene as compared to a platinum only catalyst. The platinum provides effective catalyzation of other species as well as provided enhanced poison resistance, particularly to sulfur and sulfur compounds.

An exemplary mode of preparation of partial oxidation catalyst compositions utilizable in accordance with the present invention is set forth in the following Example 1.

EXAMPLE 1

(a) To 229 g of 5 wt % $CeO_2$ - 95 wt % $Al_2O_3$ powder (a predominantly gamma alumina which has been stabilized by incorporation of ceria therein) is added a solution containing 21 g Pt as $H_2Pt(OH)_6$ solubilized in monoethanolamine so as to give total volume of 229 ml. After mixing for 5 minutes, 25 ml of glacial acetic acid is added and then the material is mixed an additional 5 minutes before being dried and then calcined for one and one half hours at 350° C. in air to form a free flowing powder.

(b) Similarly, to 229 of 5 wt % $CeO_2$ - 95 wt % $Al_2O_3$ powder there is added 21 g Pd as $Pd(NO_3)_3$. The material is mixed and reduced with 16 ml of $N_2H_4H_2O$ solution with constant mixing. The impregnated powder is dried and then calcined for one and one half hours at 375° C. in air.

(c) Two hundred grams of each powder (a) and (b) is added to ½ gallon size ball mill with appropriate amount of grinding media. To the powder is added 20 ml of glacial acetic acid and 550 ml of $H_2O$. The sample is ball milled for 16 hours. The resulting slurry has a solids content of 43%, a pH of 4.0 and a viscosity of 337 cps and is used to coat a Corning codierite monolith having a diameter of 3.66", a length of 3" and 400 gas flow passages (of square cross section) per square inch end of face area. The coating is accomplished by dipping the monolith in the slurry for 2 minutes, draining excess slurry and blowing the excess slurry from the gas flow passages with high pressure air. The resultant slurry-coated monolith is dried at 110° C. and calcined at 500° C. in air for 30 minutes. The finished catalyst body contains 238 g of platinum group metal per cubic foot of catalyst body volume at a weight ratio of platinum to palladium of 1:1, with the platinum group metal dispersed on a ceria-stabilized alumina "washcoat" support layer. The catalyst body contains 1.4 grams per cubic inch of catalyst body of stabilized alumina washcoat.

A series of partial oxidation catalyst compositions utilizeable in accordance with the present invention were prepared by substantially the procedure described in Example 1, with appropriate modifications to obtain the reported loadings of different catalyst metals. Each of the below described materials is a monolithic catalyst composition. Except for the catalyst identified as CPO-5, in each case the honeycomb carrier is a C-400 cordierite carrier (400 gas flow passages per square inch of end face area) manufactured by Corning. The CPO-5 catalyst is on an alpha alumina monolith body, sold under the trademark TORVEX by DuPont, and having 64 gas flow channels per square inch of end face area. The Corning cordierite monoliths have gas flow channels which are square in cross section; those of the TORVEX monolith are hexagonal in cross section. The amount of platinum group metal on the catalyst is given in grams of elemental platinum group metal per cubic foot of monolith catalyst. The weight ratio of the platinum group metals in the order listed is given in parentheses. Thus, catalyst CPO-1 in Table 1, for example, contains platinum and palladium in a weight ratio of one part platinum to one part palladium. In each case, the refractory metal oxide coating is alumina, predominantly comprising gamma alumina stabilized as indicated, the respective weight percents of stabilizer being indicated, the balance comprising substantially alumina.

TABLE I

| Catalyst | PG Metal Component | PG Metal g/ft³ | Weight % and Stabilizer in Support Coating | Alumina Support coating g/in³ (% Stabilizer) |
|---|---|---|---|---|
| CPO-1 | Pt,Pd(1:1) | 219 | 5% ceria | 1.27 |
| CPO-2 | Pt,Pd(1:1) | 186 | 5% ceria | 1.64 |
| CPO-3 | Pt,Pd(1:4) | 275 | 5% ceria | 1.79 |
| CPO-4 | Pt,Pd(1:0) | 310 | 5% ceria | 2.32 |
| CPO-5* | Pt,Pd(1:1) | 200 | 5% ceria | 1.26 |
| CPO-6 | Pt,Pd,Rh (9.5:9.5:1) | 230 | 5% ceria | 1.47 |
| CPO-7 | Pt,Pd(1:1) | 186 | 2.5% lanthia 2.5% baria | 1.64 |

*TORVEX alpha alumina monolith; all others are cordierite monoliths.

Preferred catalyst metals are platinum and palladium and combinations thereof, preferably 25–75%, more preferably 60–40%, by weight palladium, and about 90 to 10% by weight platinum, preferably 75 to 25%, more preferably 40 to 60% by weight platinum. Generally, as the sulfur content of the hydrocarbon feed being treated in the first catalyst zone increases, a higher proportion of platinum to palladium is preferred. On other other hand, for feeds which have a relatively high methane content, an increasing proportion of palladium is preferred.

The monolithic configuration of the catalytic partial oxidation catalyst of the first catalyst zone affords a relatively low pressure drop across it as compared to the packed bed of a particulate support catalyst. This is particularly important in view of the increase in gas volume occasioned by the reactions taking place in the first catalyst zone. The total moles of product produced in the first catalyst zone is higher than the total moles of $H_2O$, oxidant gas and hydrocarbon feed introduced therein. The individual gas flow passages of the monolith also serve, in effect, as individual adiabatic chambers, thus helping to reduce heat loss and promote hydrocracking. This is particularly so when the monolithic carrier comprises a ceramiclike material such as cordierite which has generally better heat insulating properties than do the metal substrates and, to this extent, the ceramic-type monolithic carriers are preferred over the metal substrate monolithic carriers. Further, as the monolith body becomes heated during operation, it serves as an excellent heat source, radiating heat back towards the incoming gas stream which is pre-heated thereby, thus facilitating desired hydrocracking and oxidation reactions.

STEAM REFORMING CATALYST

The steam reforming catalyst utilized in the second catalyst zone in accordance with the present invention may utilize a monolithic carrier as described above in connection with the partial oxidation catalyst or it may comprise a particulate support such as spheres, extrudates, granules, shaped members (such as rings or saddles) or the like. As used herein and in the claims, the term "particulate catalyst" or the like means catalysts of regularly or irregularly shaped particles or shaped members or combinations thereof. A preferred particulate support is alumina pellets or extrudate having a BET (Brunnauer-Emmett-Teller) surface area of from about 10 to 200 square meters per gram. Alumina or alumina stabilized with rare earth metal and/or alkaline earth metal oxides as described above, may be utilized as the pellets or extrudate. An alumina particulate support stabilized with lanthanum and barium oxides as described above is preferred.

The catalytically active metals for the steam reforming catalyst may comprise any of the catalytic metals known for such purpose, for example, nickel, cobalt and mixtures thereof are well suited for use as steam reforming catalysts. Platinum group metals such as platinum and rhodium or both may also be utilized for steam reforming, as is known in the art. A preferred platinum group metal steam reforming catalyst is a combination of platinum plus rhodium with the rhodium comprising from about 10 to 90% by weight, preferably 20 to 40% by weight, of the total platinum group metal present and the platinum comprises 90 to 100%, preferably 80 to 60%. The proportion of platinum and rhodium utilized will depend on the type of hydrocarbon feed to be treated in the process. Other platinum group metals may also be utilized. For example, as disclosed in U.S. Pat. No. 3,482,722, assigned to the assignee of this application, one or more of platinum, palladium, rhodium, iridium, osmium and ruthenium may be utilized as the steam reforming catalyst.

EXAMPLE 2

(a) A barium nitrate solution is prepared by dissolving 159.9 g $Ba(NO_3)_2$ in 1,650 ml of $H_2O$. Lanthanum nitrate, in the amount of 264.9 g $La(NO_3)_2 \cdot 6H_2O$ is dissolved in the barium nitrate solution by mixing vigorously to yield a barium-lanthanum solution, to which is added to 3,000 g of high surface area gamma alumina powder. The solution and powder are thoroughly mixed in a sigma blade mixer for 30 minutes.

(b) The impregnated alumina resulting from step (a) was extruded through 1/16" diameter dies so as to give 1/16" diameter extrudate in lengths from ¼" to ⅜".

(c) The extrudates from step (b) were dried at 110° C. for 16 hours and then calcined 2 hours at 1,050° C. in air.

(d) A platinum-rhodium solution was prepared by dissolving 42.0 g Pt as $H_2Pt(OH)_6$ in monoethanolamine and 18.0 g Rh as $Rh(NO_3)_3 \cdot 2H_2O$ and combining the materials in $H_2O$ to provide a solution having a volume of 1,186 ml and a pH of 0.7 after adjustment with concentrated $HNO_3$.

(e) The platinum-rhodium solution of step (d) is added to the extrudate obtained in step (c) in a tumbling coater mixed for 30 minutes. The impregnated extrudate is dried at 120° C. for 4 hours and then calcined for 30 minutes at 500° C. in air.

The resultant particulate steam reforming catalyst, designated SR-1, comprises 1.4 wt % platinum and 0.6 wt % rhodium on a $La_2O_3$- BaO stabilized gamma alumina extrudate.

The catalysts of Examples 1 and 2 were utilized in test runs. Before describing these test runs, however, preferred embodiments of the apparatus of the present invention are described in some detail below.

THE REACTOR VESSEL

Preferably, the reactor utilized in the autothermal reforming process of the invention comprises a fixed bed, adiabatic reactor. FIG. 1 shows a somewhat schematic rendition of a preferred laboratory or pilot plant size reactor comprising a unitary vessel 1 within which a monolithic carrier partial oxidation catalyst 2 is disposed in flow communication via a passageway 3 with a bed of steam reforming catalysts 4. The vessel is suitably insulated by thermal insulating material 5 to reduce heat losses and to provide essentially a fixed bed, adiabatic reactor. Inlet lines 6, 7 and 8 feed a mixer 9 with, respectively, a hydrocarbon feed, steam and oxygen. The latter may be introduced as an oxygen containing, for example, air. The admixed reactants are introduced through an inlet line A into partial oxidation catalyst 2, thence via passage 3 into steam reforming bed 4 from which the contacted material is withdrawn through outlet line B. Valves, flow meters and heat exchange units, utilized in a manner known to those skilled in the art, are not shown in the schematic illustration of FIG. 1.

In order to exemplify operation of the autothermal reforming process, test runs were carried out in an apparatus substantially in accordance with that schematically illustrated in FIG. 1, in which the monolithic carrier catalyst 2 was of cylindrical configuration, three quarters of an inch in diameter and nine inches long. The steam reforming bed was a cylindrical bed of particulate catalyst three inches in diameter by nine and a quarter inches long. The following test runs were carried out and the indicated results obtained. In operation, the reactants were preheated with the oxidant stream being preheated separately from the hydrogen feed as a safety measure. After preheating, the streams were intimately mixed and immediately fed into the partial oxidation catalyst 2 of vessel 1. Generally, all the oxygen present in the feed reacts within monolithic catalyst bed 2 to oxidize a portion, but not all, of the hydrocarbon feed, resulting in an increase in temperature due to the exothermic oxidation reaction. At least some of the $C_5$ and heavier hydrocarbon is hydrocracked in catalyst bed 2 to lighter, $C_1$ to $C_4$ hydrocarbon fractions. The heated, partially oxidized and hydrocracked effluent from catalyst bed 2 is then passed through steam reforming catalyst bed 4 wherein the steam reforming reaction takes place. The product gases withdrawn via outlet B are cooled and unreacted water as well as any unreacted hydrocarbon feed is condensed and removed therefrom. The dry gas composition was monitored by gas chromatography.

EXAMPLE 3

(a) A monolithic oxidation catalyst made in accordance with Example 1 has the following composition:

186 g of platinum group metal (PGM) per cubic foot of catalyst volume, the PGM comprising platinum and palladium in a 1:1 weight ratio. The PGM is distended upon a lanthia-baria stabilized predominantly gamma alumina washcoat dispersed on a Corning cordierite monolith ¾ inch (1.9 cm) in diameter and 9 inches (22.9 cm) in length, and having 400 gas flow passages per square inch of end face area. The monolith is loaded with 1.64 g of washcoat per cubic inch of catalyst volume.

(b) A PGM steam reforming catalyst is provided by 1,075 ml of catalyst SR-1 of Example 2, in a packed bed measuring 3 inches (7.62 cm) in diameter and 9¼ inches (23.5 cm) in depth.

(c) The hydrocarbon feed in a No. 2 fuel oil having the following properties:
API Gravity: 34.7
Distillation Range: 374°-664° F.
Sulfur Content: 1200 parts per million (weight)
Hydrocarbon Classes per ASTM D1319:
  Aromatics: 22.0%
  Olefins: 5.7%
  Saturates: 72.3%

(d) The reactor vessel is a fixed bed, adiabatic pressure vessel reactor of the type schematically illustrated in FIG. 1. For safety considerations, the oxidant stream, comprising air, is preheated separately from the hydrocarbon stream in a preheater (not shown in FIG. 1). The steam is separated into two streams, one of which is blended with the oxidant and one with the hydrocarbon feed. The preheated streams are intimately mixed within a mixer, schematically illustrated in 9 in FIG. 1, and the combined inlet stream at a temperature of 35 atmospheres and a preheat temperature of 1200° F. (649° C.), is immediately fed to the partial oxidation catalyst. The partial oxidation catalyst (2 in FIG. 1) in the first catalyst zone contains the monolithic catalyst of (a), above, and the steam reforming catalyst (4 in FIG. 1) in the second catalyst zone contains the SR-1 catalyst of (b), above.

All of the oxygen contained in the inlet feed is completely reacted and a sufficient amount of the hydrocarbon is oxidized to heat the effluent reactant mass, by the exothermic catalytic oxidation reaction, to a temperature of 942° C., high enough for steam reforming. The effluent from the catalytic partial oxidation catalyst 2 is immediately flowed into the steam reforming catalyst 4 and then withdrawn via the outlet opening as indicated by the arrow B in FIG. 1, at an exit temperature of 1432° F. (778° C.). The volumetric throughput rate through the partial oxidation catalyst was 126,000 volumes of throughput at standard temperature and pressure per volume of catalyst per hour and the volumetric throughput rate through the steam reforming catalyst (same basis) was 6,500.

The product gas is cooled and unreacted water (and any unreacted hydrocarbon oil) is condensed therefrom. The dry gas composition is monitored by gas chromatography and the following results were measured and the results tabulated in Table II.

TABLE II

| A. Effluent Composition and Hydrocarbon Conversion | |
|---|---|
| Conversion of Dried Product Gas | Dried Product Gas Composition. Mole % As Measured |
| $H_2$ | 41.11 |
| CO | 11.52 |
| $CO_2$ | 12.51 |
| $N_2$ | 34.37 |
| $CH_4$ | 0.26 |
| $C_2H_6$ | 0.01 |
| Hydrocarbon Conversion | 98.8%* |

*weight percent of quantity of hydrocarbon feed to the reactor.

The foregoing Example 3 shows the efficacy of the process for substantially complete (98.8%) conversion of a No. 2 fuel oil, which is a difficult feedstock to convert by conventional steam reforming. The process of the invention can of course readily handle lighter hydrocarbon feeds, which are easier to reform, and use higher $O_2$ to C ratios.

For the preparation of a hydrocarbon and carbon oxides containing synthesis gas suitable for methanol synthesis, oxygen is used as the oxidant stream in order to avoid introducing nitrogen of the air into the product gas. The basic chemistry for the synthesis of methanol is $$CO + 2H_2 = CH_3OH \quad (1)$$

$$CO_2 + 3H_2 = CH_3OH + H_2O \quad (2)$$

Reaction (2) is seen to involve the water-gas shift reaction $$CO_2 + H_2 = H_2O + CO \quad (3)$$

in combination with reaction (1).

As will be seen from the above chemistry, the ratio of hydrogen to the carbon oxides should be adjusted to provide at least one mol of $H_2$ to ($\frac{1}{2}$ mol CO + $\frac{1}{3}$ mol $CO_2$). The flexibility of operation available by utilizing autothermal reforming in accordance with the present invention enables control of the $H_2O$ to carbon ratio and $O_2$ to carbon ratio at rather low levels, without the problem of carbon deposition on the catalyst. This flexibility enables the control of the output ratio of hydrogen to carbon oxides with a wide variety of feedstocks. Since operation close to the carbon deposition region is available with the catalysts of the present invention, low $H_2O$ to carbon ratios can be used. The following Table III shows the effect of some of these operating parameters in the autothermal reforming with resultant molar ratio of $H_2$: ($\frac{1}{2}$CO plus $\frac{1}{3}CO_2$). Generally, $H_2/(2CO+3CO_2)$ should be unity or greater, say from about 1.0 to 2.0 more preferably from about 1.3 to about 1.5.

TABLE III

| Inlet Temperature (Line 136 in FIG. 3) | | 1200° F. |
| Exit Temperature (Line 144 in FIG. 3) | | 1800° F. |
| Reformer Pressure | | 30 atm. |

| INLET CONDITIONS (Line 136 in FIG. 3) | | PRODUCT RESULTS (Line 146 in FIG. 3) | |
|---|---|---|---|
| $H_2O/C$ | $O_2/C$ | $CH_4$ Conversion, % | $H_2/(2CO + 3CO_2)$ |
| 3/1 | .5734 | 99.1 | 0.935 |
| 2/1 | .5452 | 98.0 | 0.9515 |
| 1/1 | .5054 | 94.0 | 0.9655 |

It will be appreciated that low $H_2O$ to carbon ratios enable the utilization of lower $O_2$ to carbon ratios, thereby reducing the needed capacity of an oxygen separation plant. Although the total amount of methane (or other hydrocarbon feed) converted is reduced thereby, the unconverted hydrocarbon is eventually recycled to the process. Thus, there is a trade-off between the effect of methane as an inert in the methanol synthesis loop versus the cost of the oxygen separation plant required.

The following Example 6 shows the operation of a methanol synthesis plant utilizing an autothermal reformer, giving typical results obtained thereby.

EXAMPLE 6

Autothermal Reforming of Natural Gas to

Supply a Methanol Synthesis Reactor

Reformer Inlet Stream-(Line 136 of FIG. 2

Temperature: 1200° F.
$H_2O/C$ Ratio: 2.00
$O_2/C$ Ratio: 0.542
Pressure: 67.7 Atmospheres Reformer Outlet Stream-(Line 144 of FIG. 3)

Temperature: 1850° F.

| | FLOW RATES - MOLES/HR | | |
|---|---|---|---|
| | Reformer Inlet Stream (Line 136 of FIG. 2) | Reformer Outlet (Line 144 of FIG. 2) | Reformer Inlet Stream (Dry Basis) | Reformer Outlet (Dry Basis) MOLE % |
| $H_2$ | — | 2.0662 | 2.0662 | 67.2 |
| $H_2O$ | 2.0 | 1.8273 | — | — |
| $CH_4$ | 1.0 | 0.0533 | 0.0533 | 1.7 |
| CO | — | 0.6375 | 0.6375 | 20.7 |
| $CO_2$ | .0049 | 0.3141 | 0.3141 | 10.2 |
| $O_2$ | .5416 | — | — | — |
| $N_2$ | .0032 | 0.0032 | 0.0032 | 0.2 |
| | | | | 100.00 |
| | $H_2/(2CO + 3CO_2) = 0.932$ | | | |

Referring now to FIG. 2, there is shown a schematic illustration of a methanol synthesis plant, which includes a synthesis gas making section, in accordance with one embodiment of the present invention. A source of hydrocarbonaceous feed, in this case a hydrocarbon feed, say natural gas, is introduced via line 110 and hydrocarbon feed compressor 112 for passage through a heater 114 and thence to a mixer 116 for admixture with oxygen, steam and recycled purge gas as described below.

Hydrocarbon feed compressor 112 compresses the hydrocarbon feed to the elevated pressure at which the autothermal reforming operation is to be carried out. Heater 114 may be of any conventional design and would include a burner means (not shown) for combusting a fuel therein to provide preheating by indirect heat transfer to the streams passing therethrough.

An air compressor 118 is supplied with atmospheric air via an inlet line 120 and compresses the air to the pressure at which the autothermal reforming operation is to be carried out. The compressed air is passed via line 122 to an air separation zone 128 wherein oxygen is separated from the compressed air by any suitable means known to those skilled in the art. The resultant oxygen stream is fed via line 130 through heater 114 for preheating and thence to mixer 116. In air separation zone 128, a nitrogen stream 129, which also contains rare gases, including argon, found in air is removed from the process and is normally recovered as a nitrogen gas by-product. The argon and other inert gases which are removed from the process in air separation zone 128 advantageously reduce the total inerts which will ultimately find their way into the methanol synthesis loop via the synthesis gas, and therefore reduces the amount of purge gas which must be withdrawn from the loop.

Air separation plant 128 may use any suitable type of air separation process including, for example, a cryogenic separation process, a membrane diffusion process, or a pressure-swing absorption process utilizing inorganic absorbants or carbon molecular sieves. Although not shown on the flow sheet of FIG. 2, heat available from the autothermal reforming process (shown in FIG. 2 as being utilized only in heat exchanger 132) may also be utilized in the air separation zone 128 if an air separation process is utilized which requires a heat input.

As illustrated in the schematic diagram of FIG. 2, line 129 carries nitrogen, or at least a nitrogen-enriched stream, away from the air separation plant 128. It may also contain a substantial proportion, if not all, of the argon, which comprises about one percent of atmospheric air.

Make-up water is introduced via line 124 and, together with recycled water obtained as described below and introduced via line 126, enters boiler feed water pump 128 from where it is passed by line 130 through heat exchanger 132, in which the water is heated to steam and transmitted via line 134 into mixer 116. The mixed gases are passed via line 136 into autothermal reformer 142. Reformer 142 of FIG. 2 has a neck portion 142a and a main body portion 142b within which are disposed, respectively, a monolithic platinum group metal partial oxidation catalyst and a platinum group metal steam reforming catalyst. In reformer 142, the inlet stream mixture of hydrocarbon feed, steam and oxygen is passed initially through a catalytic partial oxidation catalyst supported on a monolithic honeycomb carrier disposed within the neck portion 142a of reformer 142. The effluent from the first catalyst zone passes into the second catalyst zone comprising a platinum group metal steam reforming catalyst contained within main body portion 142b of autothermal reformer 142. Generally, as mentioned above, a portion, less than all, of the hydrocarbon feed content of the inlet stream is catalytically oxidized within the first catalyst zone. If $C_5$ or heavier hydrocarbons form a part of the feed, they are hydrocracked under the conditions prevailing in the first catalyst zone, to lighter, $C_1$ to $C_4$ constituents. The steam reforming reaction carried out in the second catalyst zone reacts $H_2O$ with unoxidized hydrocarbons to form hydrogen and carbon monoxide. Generally, the inlet stream components (hydrocarbon, oxygen and steam) react in autothermal reformer 142 to produce a mixture containing $H_2$, $CO$, $CO_2$, $H_2O$ and a small amount of residual methane.

The effluent from autothermal reformer 142 is passed via line 144 through heat exchanger 132 as mentioned above. The cooled effluent then passes through cooling zone 138, wherein it is further cooled sufficiently to effectuate separation, in separation zone 140, of water from the effluent gases. Condensed water is withdrawn via line 126 and passed to boiler feed water pump 128 as described above. If it is desired to remove $CO_2$ from the process stream the scrubber may conveniently be inserted between separation zone 140 and compressor 148. The methanol synthesis gas, now essentially comprising $H_2$, residual unseparated $H_2O$, unreacted $CH_4$, $CO$ and some $CO_2$ is passed via line 146 to synthesis gas compressor 148 of the methanol synthesis loop. Preferably from about 2 to about 10% $CO_2$ is left in the synthesis gas. The compressed synthesis gas is passed through line 150 in direct heat exchange in heat exchanger 152 with the effluent from methanol synthesis reactor 154, and then into the methanol synthesis reactor.

Any suitable methanol synthesis catalyst may be used within reactor 154, for example, various mixtures of copper, chromium, alumina and/or zinc oxide are known for use as methanol synthesis catalysts. Typical of these are mixtures of: copper, alumina and zinc oxide; chromium and zinc oxide; copper, chromium and alumina and zinc oxide. Palladium on alumina is also an effective methanol synthesis catalyst.

Within synthesis reactor 154, which is typically operated at high pressure, for about 1000–2000 psig and relatively low temperature, e.g., about 150°–400° C. only about 5% of the hydrogen and carbon oxides are converted to methanol per pass through reactor 154. The effluent, containing methanol, the unreacted portion of the synthesis gas and small amounts of other reaction products, e.g., dimethyl ether and ethanol, is withdrawn from reactor 154 via line 156 and passed through heat exchanger 152 wherein it is cooled against the incoming synthesis gas as described above. The cooled gases are passed through a cooling zone 158 and then via line 160 to gas-liquid separator 162a, wherein methanol and the heavier alcohols formed are condensed and withdrawn via line 164. The raw methanol in line 164 contains about 15% water as well as the dimethyl ether and ethanol and possibly other heavy alcohols. The raw methanol is dehydrated and purified by distillation as described below. However, if the methanol is to be used as a fuel, the trace amounts of ethanol and possibly other heavy alcohols may be retained in the methanol. Unreacted synthesis gas is removed from the top of separator 162 via line 166 and then introduced into line 146 for passage into synthesis gas compressor 148 and then back through reactor 154.

The methanol and other products separated as liquid from separator 162 are passed to a distillation zone represented by distillation column 168, wherein methanol is separated and withdrawn as product via line 170. The heavy alcohols are withdrawn from the bottom of column 168 via line 172 and a top end gas is withdrawn from the top of distillation column 168 via line 174. The heavy alcohols and dimethyl ether withdrawn for distillation column 168 may be recycled to autothermal reformer 142. Ethanol, which readily forms ethylene by dehydration, can readily be reformed in autothermal reformer 142 operator in accordance with the present invention. Ethanol would, however, be extremely difficult to reform in conventional steam reforming processes because of the tendency of the ethylene formed from it to cause carbon deposition on the catalyst in conventional reforming operations.

In order to control the level of impurities and inerts in the methanol synthesis loop, purge gas is removed via purge line 176 and may be recycled via line 130 and mixer 116 to reformer 142.

The methanol synthesis gas process of the present invention would find ready use for example, in areas where supplies of natural gas are remote from markets for natural gas, or in areas where other hydrocarbon feeds, such as normally liquid hydrocarbons, are available for conversion to methanol.

An example of operation of an autothermal reformer in accordance with the present invention for the production of a methanol synthesis gas is well illustrated by the following Example 7, wherein a liquid petroleum gas feedstock is autothermally reformed. The results obtained are shown in Table IV. Although the operation of Example 7 was actually carried out using air as the oxidant stream, the same results with the same $O_2$ to carbon and $H_2O$ to carbon ratios could be obtained utilizing oxygen as the oxidant stream, inasmuch as the nitrogen is essentially inert in the autothermal reforming process. The results of Table IV are reported on both an "as measured" and a "nitrogen free" basis.

EXAMPLE 7

A Liquid petroleum Gas (LPG) feedstock was autothermally reformed with the same catalysts as employed in Example 3. The composition of the feedstock was:

|  | Mole % |
|---|---|
| Ethylene | 4.60 |
| Propane | 70.17 |
| Propylene | 25.07 |
| i-Butane | 0.15 |
| n-Butane | 0.01 |

The feedback was not desulfurized for the test. The $H_2O$ to C ratio was 3.11 and the $O_2$ to C ratio was 0.50. The results obtained are listed in Table IV below.

TABLE IV

| Constituents of Dried Product Gas | Dried Product Gas Composition, Mole % | |
|---|---|---|
| | As Measured | $N_2$ Free Basis |
| $H_2$ | 39.4 | 65.38 |
| CO | 8.78 | 14.57 |
| $CO_2$ | 12.09 | 20.05 |
| $N_2$ | 39.72 | — |
| $CH_4$ | 0.00 | 0.00 |
| Hydrocarbon Conversion | 100%* | 100%* |

B. Throughput and Temperatures

Volumetric throughput rate, volumes of throughput at standard temperature and pressure per volume of catalyst per hour:
monolithic partial oxidation catalyst (item = 2 in FIG. 1) 145,000
particulate steam reforming catalyst (item = 4 in FIG. 1) 7,800
Interstage Temperature (between items 2 and 4 of FIG. 1) 906

TABLE IV-continued

| Constituents of Dried Product Gas | Dried Product Gas Composition, Mole % | |
|---|---|---|
| | As Measured | $N_2$ Free Basis |
| Preheat Temperature (line A of FIG. 1) | | 749° C. |
| Exit Temperature (line B of FIG. 1) | | 837° C. |

*weight percent of quantity of hydrocarbon feed to the reactor.

The ratio of $H_2$ to $(2CO+3CO_2)$ in the product gas of the example is 0.732 due to the high $H_2O/C$ ratio of 3.1 that was used. For methanol synthesis gas a lower $H_2O/C$ level is desirable. $CO_2$ can be readily removed from this gas stream to adjust the ratio of $H_2$ to the carbon oxides. Upon removal of $CO_2$ from the gas stream, the ratio of $H_2$ to $(2CO+3CO_2)$ may be easily adjusted to from about 1.1 to about 2.1 while leaving in a small amount of $CO_2$.

While the invention has been described in detail with respect to specific preferred embodiments thereof, it will be appreciated that those skilled in the art, upon a reading and understanding of the foregoing, will readily envision modifications and variations to the preferred embodiments which are nonetheless within the spirit and scope of the invention and of the claims.

What is claimed is:

1. A process for the production of methanol from a hydrocarbonaceous feed, comprising the steps of:
   (a) preheating an inlet stream comprising a hydrocarbonaceous feed, $H_2O$, and oxygen to a preheat temperature sufficiently high to initiate catalytic oxidation of said feed as defined below;
   (b) introducing the preheated inlet stream into a first catalyst zone comprising a monolithic body having a plurality of gas flow passages extending therethrough and having a catalytically effective amount of palladium and platinum catalytic components dispersed therein, the amounts of feed, $H_2O$, and oxygen introduced into said first catalyst zone being controlled to maintain is said inlet stream an $H_2O$ to C ratio of from about 0.5 to 3 and an $O_2$ to c ratio of from about 0.35 to 0.65;
   (c) contacting the preheated inlet stream within said first catalyst zone with said palladium and platinum catalytic components to initiate and sustain therein catalytic oxidation of said feed to produce hydrogen and carbon oxides therefrom the temperature of at least about 250° F. (139° C.) greater than the ignition temperature of said inlet stream, and oxidizing in said first catalyst zone a quantity, less than all, of said feed, which quantity is sufficient to heat such first zone effluent to an elevated temperature high enough to catalytically steam reform, within a second catalyst zone defined below, hydrocarbon remaining is such first zone effluent without supplying external heat thereto;
   (d) passing the first zone effluent, while still at an elevated temperature, from said first catalyst zone to a second catalyst zone containing a platinum group metal steam reforming catalyst therein, and contacting the first zone effluent is said second catalyst zone with said reforming catalyst to react hydrocarbons therein with $H_2O$ to produce hydrogen and carbon oxides therefrom;
   (e) withdrawing the effluent of said second catalyst zone as said hydrogen-rich synthesis gas and cooling said synthesis gas;

(f) passing said synthesis gas from step (e) to a methanol synthesis loop to react the hydrogen with carbon oxides thereof over a methanol synthesis catalyst at methanol synthesis conditions; and (g) withdrawing methanol as product from said methanol synthesis loop.

2. The process of claim 1 wherein said hydrocarbonaceous feed is a hydrocarbon feed.

3. The process of claim 1 or claim 2 wherein the preheat temperature is from about 800° F. to 1400° F. (427° C. to 760° C.).

4. The process of claim 3 wherein said first catalyst zone is maintained at a temperature of from about 1750° F. to 2400° F. (954° C. to 1316° C.) and the first zone effluent is introduced into said second catalyst zone at substantially the same temperature.

5. The process of claim 3 wherein a volumetric hourly rate of at least 100,000 volumes of throughput per volume of catalyst is maintained in said first catalyst zone.

6. The process of claim 5 wherein a volumetric hourly rate of from about 2,000 to 20,000 volumes of throughput per volume of catalyst is maintained is said second catalyst zone.

7. The process of claim 3 wherein said first catalyst zone comprises palladium, platinum, and optionally, rhodium catalytic components distended upon a refractory metal oxide support layer carried on said monolithic body.

8. The process of claim 7 wherein said catalytic component of said first catalyst zone comprises, on an elemental basis, about 10 to 90% by weight palladium and about 90 to 10% by weight platinum.

9. The process of claim 8 wherein said catalytic component of said first catalyst zone comprises about 25 to 75% by weight palladium, and about 75 to 25% by weight platinum.

10. The process of claim 9 wherein said catalytic component of said first catalyst zone comprises from about 60 to about 40% by weight platinum and from about 40% to about 60% by weight palladium.

11. The process of claim 3 wherein said steam reforming catalyst comprises one or both of platinum and rhodium catalytic components.

12. The process of claim 3 carried out at a pressure of from about 100 to 1500 psia.

13. The process of claim 7 wherein said steam reforming catalyst comprises one or both of platinum and rhodium catalytic components.

14. The process of claim 7 wherein said steam reforming catalyst comprises, an element metal basis, from about 10 to 90% rhodium and from about 90 to 10% by weight platinum.

15. The process of claim 14 wherein said steam reforming catalyst comprises from about 20 to 40% by weight rhodium and 80 to 60% by weight platinum.

16. The process of claim 1 or claim 2 wherein the amounts of feed, $H_2O$, and oxygen introduced into said first catalyst zone are controlled to maintain in said inlet stream an $H_2O$ to C ratio of from about 1 to 2.5 and an $O_2$ to C ratio of from about 0.5 to 0.6.

17. The process of claim 1 or claim 2 carried out at a pressure of from about 100 to 1500 psia.

18. A process for the production of methanol from a hydrocarbon feed, comprising the steps of:

(a) preheating an inlet stream comprising a hydrocarbon feed, $H_2O$, and oxygen to a preheat temperature of about 800° F. to 1400° F. (427° C. to 760° C.) and introducing the preheated inlet stream at a pressure of from about 100 to 1500 psia into a first catalyst zone comprising a monolithic body having a plurality of gas flow passages extending therethrough and having a catalytically effective amount of palladium and platinum catalytic components dispersed therein, the amounts of hydrocarbonaceous feed, $H_2O$ and oxygen introduced into said first catalyst zone being controlled to maintain in said inlet stream a $H_2O$ to C ratio of from about 0.5 to 3, and an $O_2$ to C ratio of from about 0.4 to 0.65;

(b) contacting the preheated inlet stream within said first catalyst zone with said palladium and platinum catalytic components at a volumetric hourly rate of at least about 100,000 volumes of throughput per volume of catalyst per hour to initiate and sustain therein catalytic oxidation of said hydrocarbonaceous feed to produce hydrogen and carbon oxides therefrom and oxidizing in said first catalyst zone a quantity, less than all, of said hydrocarbonaceous feed, which quantity is sufficient to heat such first zone effluent to an elevated temperature of from about 1750° F. to 2400° F. (954° C. to 1316° C.);

(c) passing the first zone effluent, while still at said elevated temperature, from said first catalyst zone to a second catalyst zone containing a platinum group metal steam reforming catalyst therein, and contacting the first zone effluent in said second catalyst zone with said steam reforming catalyst at an hourly volumetric rate of from about 2,000 to 20,000 volumes of throughput per volume of catalyst to react hydrocarbons therein with $H_2O$ to produce hydrogen and carbon oxides therefrom;

(d) withdrawing the effluent of said second catalyst zone as a hydrogen-rich synthesis gas, and cooling said synthesis gas;

(e) passing said synthesis gas from step (d) to a methanol synthesis loop to react the hydrogen with carbon oxides thereof over a methanol synthesis catalyst at methanol synthesis conditions; and (f) withdrawing methanol as product from said methanol synthesis loop.

19. The process of claim 18 wherein the effluent withdrawn from said second catalyst zone is further treated to remove sulfur and sulfur compounds therefrom.

20. The process of claim 18 or claim 19 wherein said platinum group metal catalyst of said first catalyst zone comprises palladium, platinum, and optionally, rhodium catalytic components and said steam reforming catalyst comprises platinum and rhodium catalytic components.

21. The process of claim 20 wherein said catalytic components of said first catalyst zone comprise, on an elemental metal basis, about 10 to 90% by weight palladium, 90 to 10% by weight platinum and said catalytic components of said second catalyst zone comprise, on an elemental basis, about 10 to 90% by weight rhodium and 90 to 10% weight platinum.

22. The process of claim 21 wherein said catalytic components of said first catalyst zone comprise about 25 to 75% by weight palladium, 75 to 25% by weight platinum and said catalytic components of said second catalyst comprise about 20 to 40% by weight rhodium, and 80 to 60% by weight platinum.

23. The process of claim 1 or claim 18 wherein conditions are maintained to provide a molar ratio of $H_2$ to $(2CO+3CO_2)$ of from about 1.0 to 2.0 by removing $CO_2$ from the effluent from said second catalyst zone.

24. The process of claim 1, wherein the process comprises the additional step of removing sulfur containing compounds and $H_2O$ from the synthesis gas.

25. The process of claim 18, wherein the process comprises the additional step of removing sulfur containing compounds and $H_2O$ from the synthesis gas.

* * * * *